(12) United States Patent
Chang et al.

(10) Patent No.: US 9,325,011 B2
(45) Date of Patent: Apr. 26, 2016

(54) CATHODE ACTIVE MATERIAL FOR LITHIUM SECONDARY BATTERY

(75) Inventors: Sung kyun Chang, Daejeon (KR); Hong-Kyu Park, Daejeon (KR); Sinyoung Park, Daejeon (KR); Je Young Kim, Daejeon (KR); Yong Tae Lee, Jeonju-si (KR)

(73) Assignee: LG Chem, Ltd., Seoul (KR)

( * ) Notice: Subject to any disclaimer, the term of this patent is extended or adjusted under 35 U.S.C. 154(b) by 332 days.

(21) Appl. No.: 12/837,916

(22) Filed: Jul. 16, 2010

(65) Prior Publication Data

US 2011/0065000 A1 Mar. 17, 2011

Related U.S. Application Data

(63) Continuation of application No. PCT/KR2010/000074, filed on Jan. 6, 2010.

(30) Foreign Application Priority Data

Jan. 6, 2009 (KR) .................. 10-2009-0000639

(51) Int. Cl.
*H01M 4/133* (2010.01)
*H01M 4/62* (2006.01)
*H01M 4/131* (2010.01)
*H01M 4/36* (2006.01)
*H01M 4/505* (2010.01)
*H01M 4/525* (2010.01)

(52) U.S. Cl.
CPC .............. *H01M 4/625* (2013.01); *H01M 4/131* (2013.01); *H01M 4/366* (2013.01); *H01M 4/505* (2013.01); *H01M 4/525* (2013.01); *H01M 4/621* (2013.01); *H01M 4/622* (2013.01); *Y02E 60/122* (2013.01)

(58) Field of Classification Search
CPC ..... H01M 4/131; H01M 4/366; H01M 4/505; H01M 4/525; H01M 4/621; H01M 4/622; H01M 4/625; Y02E 60/122
USPC .......... 429/212, 217, 223, 231.1, 231.95, 232
See application file for complete search history.

(56) References Cited

U.S. PATENT DOCUMENTS

| 2002/0127473 | A1* | 9/2002 | Ooya et al. ............. 429/232 |
| 2005/0153205 | A1* | 7/2005 | Hisashi ................ H01M 4/131 429/232 |
| 2009/0023064 | A1* | 1/2009 | Kim et al. ............... 429/209 |

FOREIGN PATENT DOCUMENTS

| CN | 1905250 A | * | 1/2007 |
| CN | 1905250 A | | 1/2007 |
| JP | 2003-59491 A | | 2/2003 |
| JP | 2003-197187 A | | 7/2003 |
| KR | 2001-0091887 | | 10/2001 |

(Continued)

*Primary Examiner* — Basia Ridley
*Assistant Examiner* — Heng Chan
(74) *Attorney, Agent, or Firm* — Birch, Stewart, Kolasch & Birch, LLP

(57) ABSTRACT

Disclosed herein is a cathode active material for a lithium secondary battery, including lithium transition metal oxide, where the lithium transition metal oxide is coated with carbon particles and a polymer resin at a surface thereof, and the polymer resin is a substance inactivated by an electrolyte for a lithium secondary battery and an organic solvent and has a melting point of at least 80° C. A lithium secondary battery having the disclosed cathode active material has advantages of improving rate properties and high temperature stability, so as to provide excellent cell characteristics.

9 Claims, 4 Drawing Sheets

(56) References Cited

FOREIGN PATENT DOCUMENTS

| KR | 10-0446660 |   | 9/2004 |
|----|------------|---|--------|
| KR | 10-2007-0081831 |   | 8/2007 |
| KR | 10-0824931 |   | 4/2008 |
| KR | 10-0838979 | * | 6/2008 |
| WO | WO 2007094562 A1 | * | 8/2007 |

* cited by examiner

CATHODE ACTIVE MATERIAL FOR LITHIUM SECONDARY BATTERY

CROSS REFERENCE TO RELATED APPLICATIONS

This application is a Continuation of PCT International Application No. PCT/KR2010/000074 filed on Jan. 6, 2010, which claims the benefit of Patent Application No. 10-2009-0000639 filed in Republic of Korea, on Jan. 6, 2009. The entire contents of all of the above applications is hereby incorporated by reference into the present application.

TECHNICAL FIELD

The present invention relates to a cathode active material and, more particularly, to a cathode active material including lithium transition metal oxide, wherein the lithium transition metal oxide is coated with carbon particles and a polymer resin at a surface thereof, and the polymer resin is inactivated by an electrolyte for lithium secondary batteries and an organic solvent and has a melting point of at least 80° C.

BACKGROUND ART

With technological advancement and demand for mobile instruments, demand for secondary batteries as an energy source is rapidly increasing.

In particular, as interest in environmental problems is increased, a great deal of research on electric vehicles and hybrid electric vehicles has been conducted in order to replace conventional automobiles using fossil fuels such as a gas-oil vehicle, a diesel vehicle, etc., which are a major cause of air pollution. Such electric vehicle or hybrid electric vehicle is generally driven using a nickel-metal hydride battery type power source, however, a lithium secondary battery with high energy density and discharge voltage is now actively being studied and partially commercialized in the related art.

Although an anode active material for a lithium secondary battery has been generally prepared using a carbon substance, lithium metal or sulfur compounds have also been proposed. As to cathode active materials for a lithium secondary battery, lithium containing cobalt oxide ($LiCoO_2$) is widely used. Additionally, other lithium transition metal oxides such as lithium containing manganese oxides such as $LiMnO_2$ with a lamellar crystal structure, $LiMn_2O_4$ with a spinel crystal structure, etc., and lithium containing nickel oxide ($LiNiO_2$) may also be used.

However, such lithium transition metal oxide used for cathode active materials has disadvantages of low electrical conductivity and insufficient charge-discharge rate properties due to low ionic conductivity of a non-aqueous electrolyte.

In order to solve such problems, some conventional techniques such as coating of a surface of a cathode active material or surface treatment of the same have been proposed. For example, a coating method of a cathode active material with conductive polymer including application of a conductive material to the cathode active material, in order to decrease contact resistance of an interface between the cathode active material and an electrolyte or side product generated at a high temperature, has been disclosed. However, improved cathode active materials with sufficient cell characteristics still need to be developed.

Furthermore, high energy density means possible exposure to risks and risks such as ignition, explosion, etc. may become more serious as energy density is increased.

Accordingly, in spite of extensive research and studies into different approaches, satisfactory results have not yet been attained.

Because of increase in energy density in proportion with increasing complexity and multi-functionality of mobile instruments, safety of the same is more significant and rate properties of a lithium secondary battery for EVs, HEVs, power tools, etc. should be further improved.

However, since safety and rate properties have substantially contradictory tendencies, it is very difficult to simultaneously enhance both the foregoing characteristics and very little research and/or discussions regarding the same are currently being conducted.

DISCLOSURE

Technical Problem

Therefore, the present invention is directed to solving conventional problems described above and to overcoming technical restrictions in related arts.

As a result of extensive studies and a number of experiments executed by the present inventors, it was found that a cathode active material prepared by applying carbon particles and a polymer resin to a surface of a lithium transition metal oxide may achieve improved electrical conductivity and ionic conductivity, thus providing excellent rate properties and increasing high temperature stability. Thereby, the present invention was successfully completed.

Technical Solution

Accordingly, the present invention provides a cathode active material including a lithium transition metal oxide, wherein the lithium transition metal oxide is coated with carbon particles and a polymer resin at a surface thereof, and the polymer resin is inactivated by an electrolyte for a lithium secondary battery and an organic solvent and has a melting point of at least 80° C.

The cathode active material of the present invention prepared by applying carbon particles and a polymer resin to a surface of the lithium transition metal oxide may have high electrical conductivity and ionic conductivity, thereby exhibiting excellent rate properties while maintaining high temperature stability.

In addition, the present inventor found that applying both the carbon particles and the polymer resin to a surface of lithium transition metal oxide as the cathode active material provides synergistic effects based on interaction of the foregoing substances. Therefore, cell performance and high temperature stability may be remarkably enhanced, compared to addition of either the carbon particles or the polymer resin alone. The reason for this fact is that the carbon particles increase electrical conductivity as well as ionic conductivity, in turn improving rate properties. Moreover, the polymer resin fused at 80° C. or more may increase internal resistance in an abnormally high temperature state of a battery so as to prevent mobility of ions and electrons, thus inhibiting ignition and/or explosion of the battery and enhancing high temperature stability.

The carbon particle applied to the surface of the cathode active material is not particularly limited so long as it can increase electric conductivity and ionic conductivity, thus improving rate properties. No-limited examples of the carbon particle may include: graphite materials such as natural graphite, artificial graphite, etc.; carbon black such as carbon black, acetylene black, ketchen black, channel black, furnace black, lamp black, summer black, etc; or carbon fiber, and so forth. These materials may be used alone or in combination with two of more thereof.

If a size of the carbon particle is too small, dispersibility is decreased due to particle aggregation and uniform coating may be difficult. On the other hand, if the size of the carbon particle is too large, it is difficult to conduct interface-coating of the surface of the lithium transition metal oxide with the carbon particle, in turn embodying insufficient conductivity. Considering these conditions, carbon based particles may have a particle diameter ranging from 0.01 to 1 µm.

Application of the carbon particles may embody enhancement of rate properties, however, may optionally deteriorate high temperature stability. Accordingly, the present invention adopts simultaneous application of a polymer resin as well as the carbon particles to a surface of the cathode active material.

The polymer resin is inactivated by an electrolyte for a lithium secondary battery and an organic solvent and has a melting point of at least 80° C.

Since the polymer resin is inactivated by the electrolyte and/or the organic solvent, the polymer resin is not removed during fabrication of an electrode and/or elution of the same into an electrolyte or degradation thereof, when the polymer resin is contained in a battery, does not occur, thereby beneficially preventing decrease in cell performance. Also, the polymer resin is fused after when an internal temperature of a battery exceeds 80° C., then, scorched and stuck on a surface of the cathode active material or flows into a gap of the cathode active material, thus reducing mobility of ions and electrons. Therefore, by increasing internal resistance of a battery, progress of electrochemical reaction may be prevented, thereby inhibiting ignition of the battery.

Such polymer resin is not particularly limited if the foregoing characteristics are embodied, however, non-limited examples thereof may be at least one selected from a group consisting of polyethylene, polypropylene, polybutylene and polystyrene, a copolymer or blend comprising two or more thereof.

The polymer resin may have a melting point of 80 to 200° C. If the melting point is less than 80° C., internal resistance may be increased even under normal operating conditions, thus decreasing cell characteristics. When the melting point is more than 200° C., it is difficult to obtain desired high temperature stability.

If a content of the polymer resin is too large, internal resistance is increase and improvement in electrical conductivity and ionic conductivity owing to addition of carbon particles may be hardly attained. On the other hand, when the polymer resin content is too small, sufficient high temperature stability may not be obtained. Alternatively, as a content of carbon particles is increased, electrical conductivity is improved, however, a coating area of the polymer resin is relatively decreased and improvement in high temperature stability may seldom be attained. Moreover, a relative content ratio of carbon particles to polymer resin which is applied to the lithium transition metal oxide may range from 90:10 to 10:90 (% by weight).

The carbon particle and the polymer resin may each be independent phases applied to a surface of the lithium transition metal oxide or, otherwise, in a composite form such that the carbon particles are entrapped inside the polymer resin.

The carbon particles and the polymer resin may be combined with the surface of lithium transition metal oxide by chemical bonding and, in consideration of simple processing and stability of the lithium transition oxide, preferably combined by physical contact such as van-der-Waals force or electrostatic force, etc.

Such physical contact may be accomplished by a simple method using, for example, a mechano-fusion device or Nobilta equipment for fusion. The mechano-fusion device utilizes physical rotation in a dried state to prepare a mixture, so as to form static coupling of constitutional components.

It is not necessary to completely coat lithium transition metal oxide with the foregoing carbon particles as well as the polymer resin, for the purpose of accomplishing functional effects of the present invention. If a coating area of both the carbon particles and the polymer resin is excessively large, mobility of lithium ions is reduced and rate properties may be deteriorated. When the coating area is too small, desired effects may not be attained. Therefore, it is preferable to coat about 20 to 80% of the overall surface of the lithium transition metal oxide with the foregoing carbon particles and the polymer resin.

If a coating amount is too small, coating effects may be hardly attained. On the contrary, when the coating amount is too large, cell performance may be deteriorated. Therefore, the coating amount man range from 0.5 to 10% by weight relative to a total weight of the active material.

The electrolyte includes lithium salt and a non-aqueous solvent and the lithium salt is a material dissolved in the non-aqueous solvent to serve as a source of lithium ions in a battery, enabling operation of a typical lithium secondary battery, and promotes movement of lithium ions between a cathode and an anode. Such lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenylborate, imides, etc.

The non-aqueous organic solvent functions as a medium used for transporting electrochemically reactive ions. Such non-aqueous organic solvent may be an aprotic solvent including, for example: N-methyl-2-pyrrolidinone; propylene carbonate; ethylene carbonate; butylenes carbonate; dimethyl carbonate; diethyl carbonate; γ-butyrolactone; 1,2-dimethoxyethane; tetrahydroxyfuran; 2-methyl tetrahydrofuran; dimethylsulfoxide; 1,3-dioxolane; formamide; dimethylformamide; dioxolane; acetonitrile; nitromethane; methyl formate; methyl acetate; phosphoric triester; trimethoxy methane; dioxolane derivatives; sulfolane; methyl sulfolane; 1,3-dimethyl-2-imidazolidinone; propylene carbonate derivatives; tetrahydrofuran derivatives; ether; methyl propionate; ethyl propionate, etc. When a mixture of two or more of the above organic solvents is used, mixing ratios thereof may be suitably regulated in consideration of cell performance, as will be appreciated by persons of ordinary skill in the art.

The organic solvent may also be a dispersion solvent used in preparing a slurry for fabrication of a cathode and, for example: water; alcohols such as methanol, ethanol, propanol, isopropanol, butanol, isobutanol, s-butanol, t-butanol, pentanol, isopentanol, hexanol, etc.; ketones such as acetone, methylethylketone, methylpropylketone, ethylpropylketone, cyclopentanone, cyclohexanone, cycloheptanone, etc.; ethers such as methylethylether, diethylether, dipropylether, diisopropylether, dibutylether, diisobutylether, di-n-amylether, diisoamylether, methylpropylether, methylisopropylether, methylbutylether, ethylpropylether, ethylisobutylether, ethyl-n-amylether, ethylisoamylether, tetrahydrofuran, etc.; lactones such as γ-butyrolactone, δ-butyrolactone, etc.; lactams such as β-lactam; alicyclic compounds such as cyclopentane, cyclohexane, cycloheptane, etc.; aromatic hydrocarbons such as benzene, toluene, o-xylene, m-xylene, p-xylene, ethylbenzene, propylbenzene, isopropylbenzene, butylbenzene, isobutylbenzne, n-amylbenzene, etc.; aliphatic hydrocarbons such as heptane, octane, nonane, decane, etc.; chain or cyclic amide such as N-methylpyrrolidone; esters such as methyl lactate, ethyl lactate, propyl lactate, butyl lactate, methyl benzoate, etc.; liquid substances to form a solvent of the electrolyte, although duly not limited thereto. The foregoing dispersion solvent may be used as a combination of two to five thereof.

Preferably, the organic solvent may be NMP, chloroform, DMSO, alkyl carbonate, etc.

Accordingly, the polymer resin of the present invention may be a substance inactivated by the foregoing electrolyte and organic solvent, which has a melting point in the range defined above.

The cathode active material is not particularly limited so long as it comprises lithium transition metal oxide capable of absorbing and discharging lithium ions and may include, for example: a lamellar compound such as lithium cobalt oxide ($LiCoO_2$), lithium nickel oxide ($LiNiO_2$), etc. or a compound substituted with one or more transition metals; lithium manganese oxide represented by $Li_{1+y}Mn_{2-y}O_4$ (wherein y ranges from 0 to 0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; Ni-site type lithium nickel oxide represented by $LiNi_{1-y}M_yO_2$ (wherein M=Co, Mn, Al, Cu, Fe, Mg, B or Ga and y ranges from 0.01 to 0.3); a composite lithium manganese compound represented by $LiMn_{2-y}M_yO_2$ (wherein M=Co, Ni, Fe, Cr, Zn or Ta and y ranges from 0.01 to 0.1) or $Li_2Mn_3MO_8$ (wherein M=Fe, Co, Ni, Cu or Zn); $LiMn_2O_4$ having Li partially substituted with alkali-earth metal; disulfide compounds; $Fe_2(MoO_4)_3$, etc., although not particularly limited thereto.

According to a preferred embodiment of the present invention, the lithium transition metal oxide may be $Li_zNi_{1-x-y}Co_xMn_yO_2$ ($0 \leq x \leq 1$, $0 \leq y \leq 1$, $0 \leq x+y \leq 1$, $0.95 \leq z \leq 1.15$).

The foregoing lithium nickel-cobalt-manganese oxide has excellent cycle properties and capacity but reduced high temperature stability. Therefore, if this oxide is coated with carbon particles and a polymer resin according to the present invention, improved rate properties and high temperature stability together with high capacity may be obtained, in turn exhibiting very excellent cell characteristics.

The present invention also provides a lithium secondary battery containing the cathode active material described above. The lithium secondary battery may comprise, for example, a cathode, an anode, a separator and a non-aqueous electrolyte containing lithium salt.

The cathode is fabricated by, for example, applying a mixture of the cathode active material, a conductive material and a binder to a cathode collector and drying the coated collector. Optionally, a filler may be added to the mixture. The anode is fabricated by applying an anode active material to an anode collector and drying the coated collector and, if necessary, may further contain the foregoing ingredients.

The anode active material may include, for example: carbon and graphite materials such as natural graphite, artificial graphite, expandable graphite, carbon fiber, hard carbon, carbon black, carbon nanotubes, fullerene, activated carbon, etc.; metals alloyable with lithium such as Al, Si, Sn, Ag, Bi, Mg, Zn, In, Ge, Pb, Pd, Pt, Ti, etc. and compounds containing the same; composites of metals and compounds thereof with carbon and graphite materials; lithium containing nitrides, and so forth.

Among these, carbon based active materials, silicon based active materials, tin based active materials, and/or silicon-carbon based active materials are more preferable and may be used alone or in combination of two or more thereof.

The separator is interposed between the cathode and the anode and consists of a thin insulation film having high ion permeability and excellent mechanical strength. A diameter of each pore in the separator generally ranges from 0.01 to 10 μm and a thickness thereof generally ranges from 5 to 300 μm. Such separator may be fabricated using a sheet or non-woven fabric made of, for example, an olefin polymer such as polypropylene having chemical resistance and hydrophobicity, glass fiber or polyethylene. When a solid electrolyte such as a polymer electrolyte is used, this electrolyte may also serve as the separator.

Another example of the separator may be an organic/inorganic composite porous separator having an active film, characterized in that at least one region selected from a polyolefin based separator substrate, a surface of the substrate and a part of a porous region in the active film is coated with a mixture of inorganic particles and a binder polymer. Optionally, the inorganic particles may be applied to an electrode side.

Such inorganic particle may include, for example, an inorganic particle with a dielectric constant of 5 or more, an inorganic particle exhibiting piezo-electricity, an inorganic particle with lithium ion transfer ability, and the like.

The binder may include, for example: polyvinylidene fluoride; polyvinyl alcohol; carboxymethyl cellulose (CMC); starch; hydroxypropyl cellulose; regenerated cellulose; polyvinyl pyrrolidone; tetrafluoroethylene; ethylene-propylene-diene terpolymer (EPDM); sulfonated EPDM; styrene-butylene rubber; fluorine rubber; different copolymers; high saponification polyvinyl alcohol, and the like.

The conductive material is used to improve conductivity of the electrode active material and may be added in an amount of 1 to 20 wt. % relative to a total weight of an electrode mixture. The conductive material is not particularly restricted so long as it exhibits conductivity while not causing chemical change of a battery. For example, the conductive material may comprise: graphite such as natural graphite or artificial graphite; carbon black such as carbon black, acetylene black, ketchen black, channel black, furnace black, lamp black, summer black, etc.; a conductive fiber such as carbon derivatives including carbon nanotubes or fullerenes, carbon fiber, metal fiber, etc.; metal powder such as carbon fluoride, aluminum or nickel powder; a conductive whisker such as zinc oxide, potassium titanate, etc.; conductive metal oxide such as titanium oxide; a conductive material such as polyphenylene derivative, and the like.

A viscosity controlling agent refers to a component regulating viscosity of an electrode mixture in order to help processes for blending and applying the electrode mixture to a collector to be more easily performed. The viscosity controlling agent is preferably added in an amount of up to 30 wt. % relative to a total weight of the electrode mixture. Examples of such viscosity controlling agent may include carboxymethyl cellulose, polyvinylene fluoride, etc., although not duly limited thereto. Optionally, the foregoing solvents may also serve as a viscosity controlling agent.

The filler used herein is an additional component to inhibit expansion of an electrode and is not particularly limited so long as it comprises fibrous materials without causing chemical change of a battery. For example, the filler may be formed using olefin based polymer such as polyethylene, polypropylene, etc. or a fibrous material such as glass fiber, carbon fiber, etc.

A coupling agent is another additional component to increase adhesion between an electrode active material and a binder, characterized in having at least two functional groups, and may be used in an amount of up to 30 wt. % relative to a weight of the binder. An example of such coupling agent may be a material having at least two functional groups wherein one of the functional groups reacts with a hydroxyl or carboxyl group present on a surface of silicon, tin or graphite based active material to form a chemical bond while another functional group reacts with a polymer binder to form another chemical bond. A preferred example of the coupling agents may be a silane based coupling agent including: triethoxysilylpropyl tetrasulfide; mercaptopropyl triethoxysilane; aminopropyl triethoxysilane; chloropropyl triethoxysilane; vinyl triethoxysilane; methacryloxypropyl triethoxysilane; glycidoxypropyl triethoxysilane; isocyanatopropyl triethoxysilane; cyanatopropyl triethoxysilane, etc., although not particularly limited thereto.

An adhesion promoter used herein is an additional component to improve adhesion of an active material to a collector and may be added in an amount of not more than 10 wt. % relative to the binder. Examples of the adhesion promoter may include oxalic acid, adipic acid, formic acid, acrylic acid derivatives, itaconic acid derivatives, and the like.

A molecular weight controller may include, for example, t-dodecylmercaptan, n-dodecylmercaptan, n-octylmercaptan, etc. A cross-linking agent may include, for example, 1,3-butanediol diacrylate, 1,3-butanediol dimethacrylate, 1,4-butanediol diacrylate, 1,4-butanediol dimethacrylate, aryl acrylate, aryl methacrylate, trimethylolpropane triacrylate, tetraethyleneglycol diacrylate, tetraethyleneglycol dimethacrylate, divinylbenzene, and the like.

The collector of the electrode is a part in which electrons move during electrochemical reaction of the active material and, based on types of the electrode, may be classified into an anode collector and a cathode collector.

The anode collector is generally fabricated with a thickness of 3 to 500 µm. So long as the anode collector exhibits conductivity and does not cause chemical change of a battery, materials of the anode collector are not particularly restricted and may include, for example, copper, stainless steel, aluminum, nickel, titanium, calcined carbon, copper or stainless steel surface-treated with carbon, nickel, titanium, silver, etc., or aluminum-cadmium alloy, and so forth.

The cathode collector is generally fabricated with a thickness of 3 to 500 µm. So long as the cathode collector exhibits high conductivity and does not cause chemical change of a battery, materials of the cathode collector are not particularly restricted and may include, for example, stainless steel, aluminum, nickel, titanium, calcined carbon, or aluminum or stainless steel surface-treated with carbon, nickel, titanium, silver, etc.

The collector may form fine unevenness on a surface thereof in order to reinforce binding of an electrode active material and be utilized in different forms such as a film, a sheet, a foil, a net, a porous body, a foam, a non-woven fabric, and the like.

A lithium secondary battery of the present invention may be fabricated according to any conventional method known in related arts. As to the inventive lithium secondary battery, configurations of the cathode, anode and separator are not particularly restricted and, for example, each sheet may be placed in a circular, angular or pouch type case in a winding or stacking form.

The lithium secondary battery according to the present invention may be employed in various devices requiring excellent rate properties and high temperature stability, for example: a power tool driven by an electric motor; an electric automobile such as an electric vehicle (EV), hybrid electric vehicle (HEV), plug-in hybrid electric vehicle (PHEV), etc.; an electric two-wheel vehicle such as an E-bike, E-scooter, etc.; an electric golf cart, and so forth, without particular limitation.

Advantageous Effects

As described above, when a cathode active material of the present invention is introduced to a lithium secondary battery, rate properties and high temperature stability may be favorably enhanced without deterioration in performance of the battery.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, exemplary embodiments of the present invention will be described in greater detail with reference to the following examples. However, those skilled in the art will appreciate that these embodiments are proposed for illustrative purpose only and do not restrict the scope of the present invention.

Example 1

After placing an active material:carbon:polyethylene in a relative ratio by weight of 100:2:2 into a dry coating device, the mixture was treated at 2.5 kW and 3,000 rpm for 5 minutes. The active material was $LiNi_{0.53}Mn_{0.27}Co_{0.20}O_2$.

Example 2

The same procedure as described in Example 1 was repeated to treat the active material except that a relative weight ratio of $LiNi_{0.53}Mn_{0.27}Co_{0.20}O_2$:carbon:polyethylene was 100:1:1.

Example 3

The same procedure as described in Example 1 was repeated to treat the active material except that a relative weight ratio of $LiNi_{0.5}Mn_{0.3}Co_{0.2}O_2$:carbon:polyethylene was 100:2:2.

Comparative Example 1

The active material used in Example 1 was prepared without additional processing.

Experimental Example 1

Figure 1:
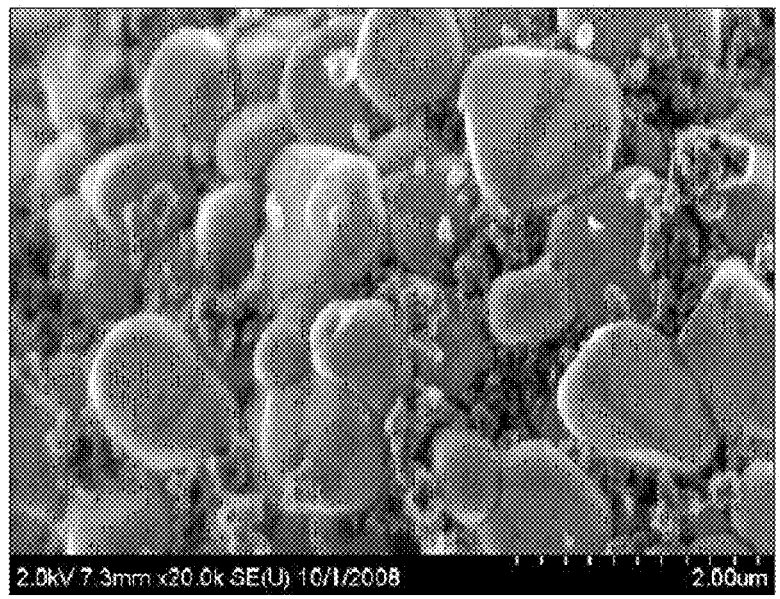
FIG. 1 is an SEM photograph showing a cathode active material prepared in Example 1.
Figure 2:
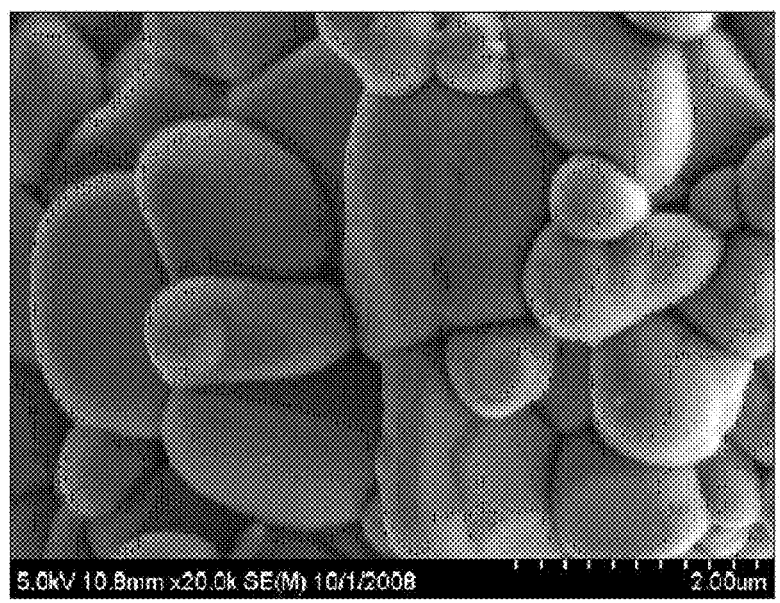
FIG. 2 is an SEM photograph showing a cathode active material prepared in Comparative Example 1.

For each of the active materials obtained in Example 1 and Comparative Example 1, a surface of the active material was observed through SEM. Observed results of the materials of Example 1 and Comparative Example 1 are shown in FIGS. 1 and 2, respectively.

Experimental Example 2

Each of the active materials obtained in Examples 1 to 3 and Comparative Example 1 was formed into a slurry by blending the active material together with a conductive material and a binder in a relative weight ratio of 95:2.5:2.5, followed by applying the slurry to Al-foil so as to form an electrode. After punching the formed electrode to reach 25% porosity, a coin cell was fabricated using the punched electrode. An anode was Li and an electrolyte was 1M $LiPF_6$ dissolved in a carbonate solvent. The fabricated cell was subjected to charge-discharge treatment at 0.1 C and 3 to 4.25V and, after monitoring capacity and cell efficiency, the results obtained for the materials of Examples 1 and 2 and Comparative Example 1 are shown in TABLE 1.

TABLE 1

| | $1^{st}$ Charge (mAh/g) | $1^{st}$ Discharge (mAh/g) | $1^{st}$ Efficiency (%) |
|---|---|---|---|
| Comparative Example 1 | 184.3 | 162.1 | 87.9 |
| Example 1 | 184.9 | 162.5 | 87.9 |
| Example 2 | 184.7 | 162.7 | 88.1 |

As shown in TABLE 1, it was found that all of the active materials exhibit favorable electrochemical performance and the active material obtained in Example 3 shows substantially the same results.

Experimental Example 3

Figure 3:
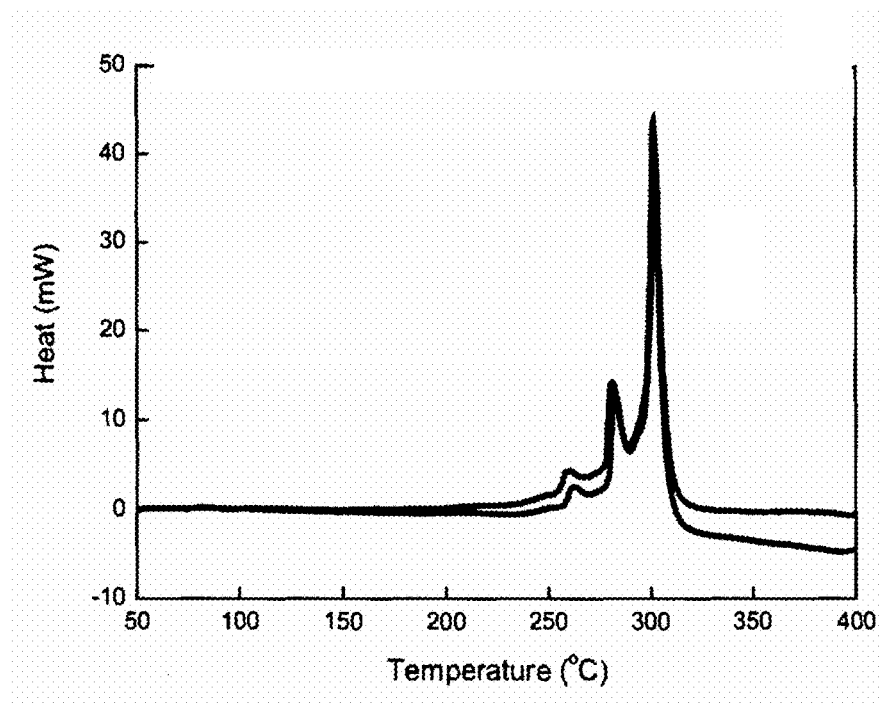
FIG. 3 illustrates a graph for measurement of heating position and heating intensity through DSC after charging a battery formed using the cathode active material prepared in Comparative Example 1 to 4.3V at 0.1 C.
Figure 4:
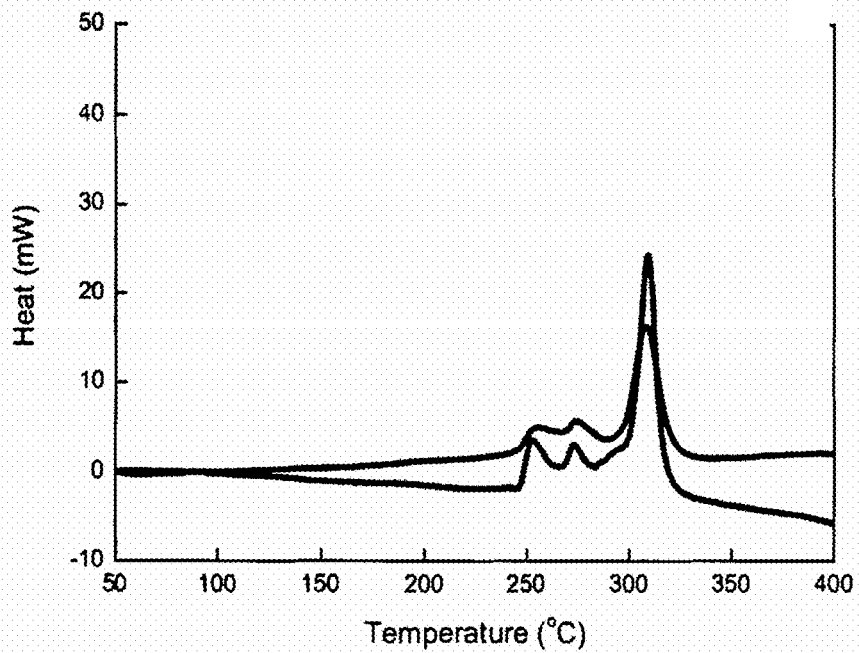
FIG. 4 illustrates a graph for measurement of heating position and heating intensity through DSC after charging a battery formed using the cathode active material prepared in Example 1 to 4.3V at 0.1 C.
Figure 5:
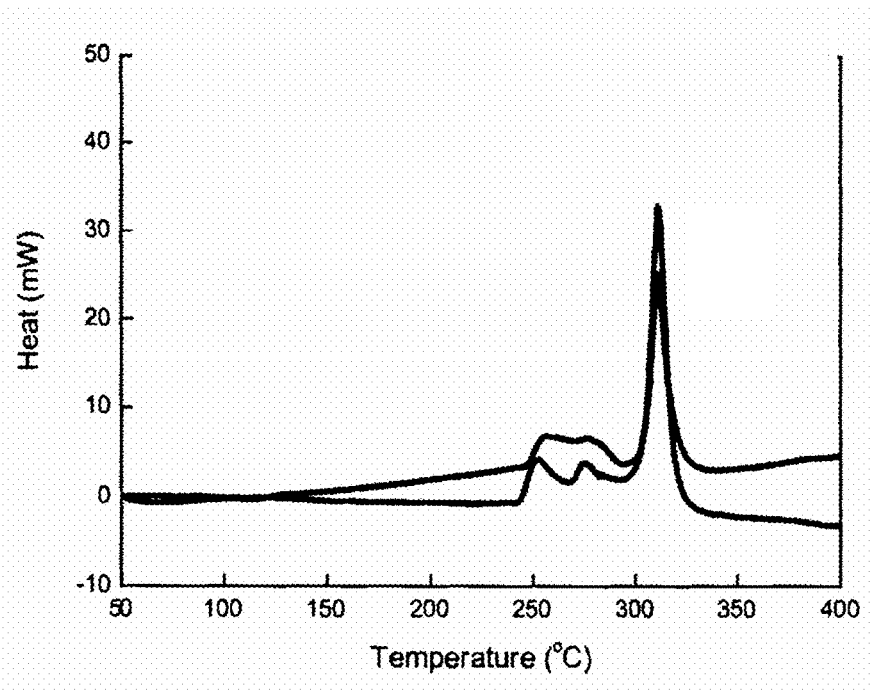
FIG. 5 illustrates a graph for measurement of heating position and heating intensity through DSC after charging a battery formed using a cathode active material prepared in Example 2 to 4.3V at 0.1 C.

After charging a cell fabricated using each of the active materials according to Experimental Example 2 to 4.3V at 0.1 C, heating position and heating intensity were measured using a differential scanning calorimeter (DSC). Results of Comparative Example 1, Example 1 and 2 are shown in FIGS. 3, 4 and 5, respectively.

Compared to Comparative Example 1, it was found that both the active materials obtained in Examples 1 and 2 have drastically reduced heating intensity. Also, it was observed that heating position of a main peak, at which the heating intensity was the strongest, shifts toward a higher temperature. In addition, it was observed that the heating intensity is further decreased while a position of the main peak shifts toward a higher temperature when carbon and polyethylene contents in the active material are increased. Example 3 also showed substantially the same results as Example 1. Consequently, we determined that safety of the active material was preferably enhanced.

Experimental Example 4

Figure 6:
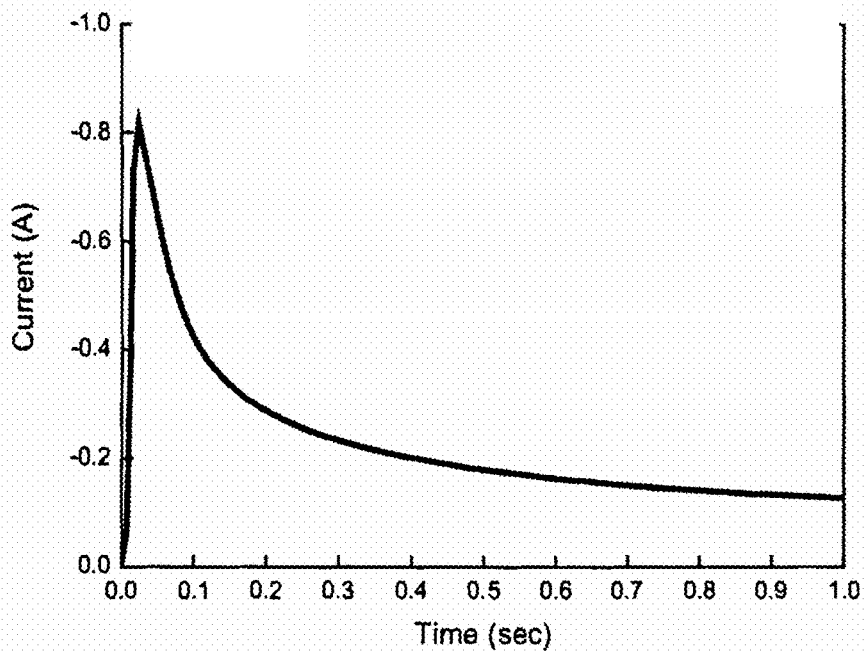
FIG. 6 illustrates a graph of measured SCC results of a battery formed using the cathode active material prepared in Comparative Example 1.
Figure 7:
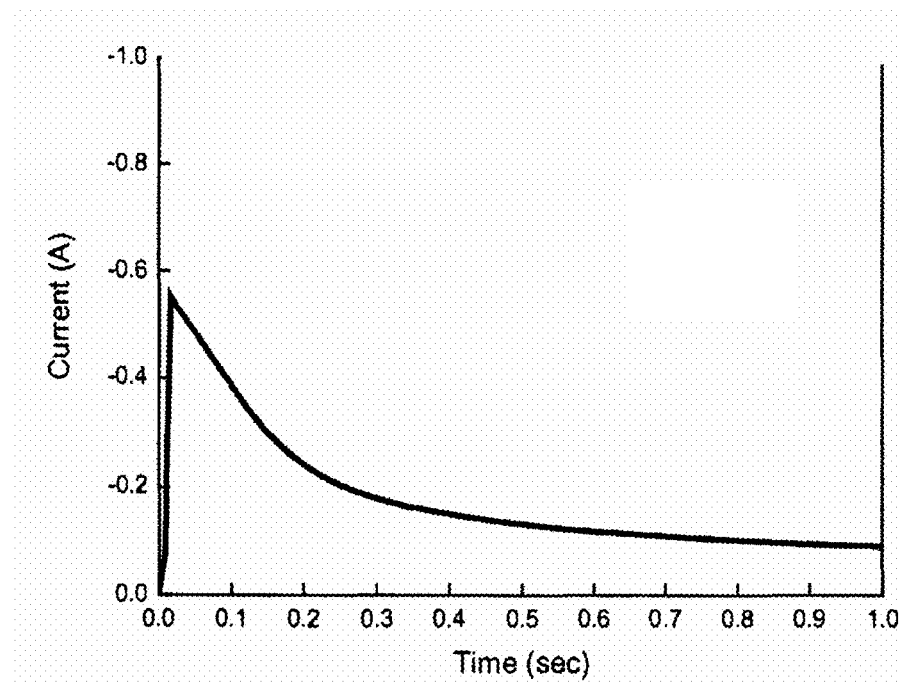
FIG. 7 illustrates a graph of measured SCC results of a battery formed using the cathode active material prepared in Example 1.
Figure 8:
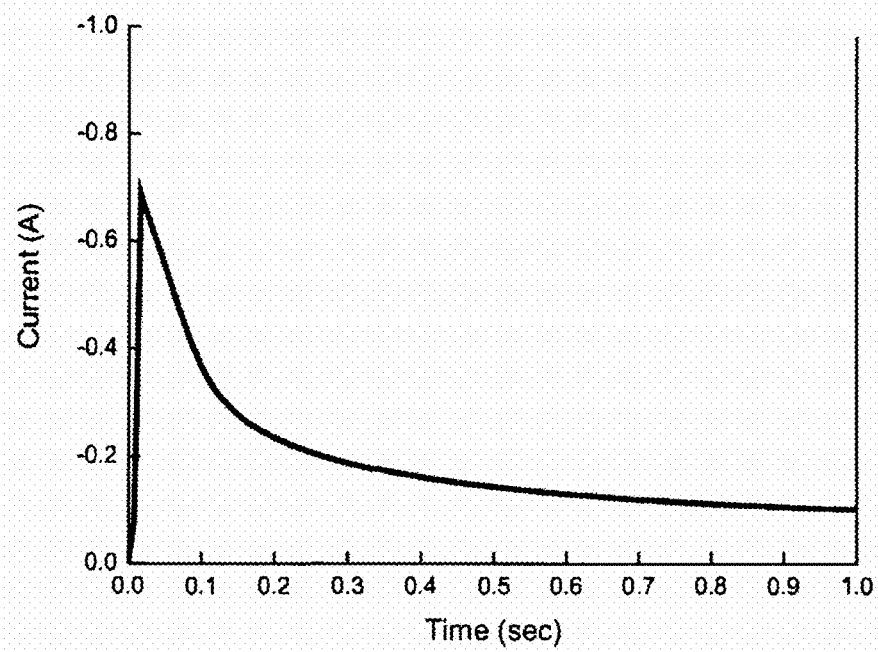
FIG. 8 illustrates a graph of measured SCC results of a battery formed using the cathode active material prepared in Example 2.

For a cell fabricated using each of the active materials according to Experimental Example 2, short circuit current (SCC) was measured. FIGS. 6, 7 and 8 show results of Comparative Example 1, Examples 1 and 2, respectively.

Compared to Comparative Example 1, it was found that both the active materials obtained in Examples 1 and 2 exhibit reduced current peaks. Also, it was observed that, as contents of carbon and polyethylene in the active material are increased, a size of the current peak is further reduced. Likewise, Example 3 shows substantially the same results as Example 1. Therefore, we determined that safety of the active material was preferably enhanced.

Although the preferred embodiments of the present invention have been disclosed for illustrative purposes, those skilled in the art will appreciate that various applications and modifications are possible on the basis of the above detailed description, without departing from the scope and spirit of the invention as disclosed in the accompanying claims.

The invention claimed is:

1. A cathode for a lithium secondary battery, comprising:
a cathode collector; and
a mixture comprising a lithium transition metal oxide, a conductive material and a binder, wherein said mixture is applied to a surface of said cathode collector,
wherein the lithium transition metal oxide is coated with carbon particles and a polymer resin at a surface thereof, and a coating is separated from the conductive material and the binder,
wherein the polymer resin is inactivated by an electrolyte for a lithium secondary battery and an organic solvent and has a melting point of at least 80° C.,
wherein a coating amount ranges from 0.5 to 10% by weight relative to a total weight of the lithium transition metal oxide,
wherein 20 to 80% of an overall surface of the lithium transition metal oxide is coated with the carbon particles and the polymer resin,
wherein the polymer resin is at least one selected from polyethylene, polypropylene, polybutylene, a copolymer or a blend comprising two or more thereof, and
wherein the carbon particles and the polymer resin are applied to a surface of the lithium transition metal oxide in a composite form such that the carbon particles are entrapped inside the polymer resin.

2. The cathode according to claim 1, wherein the carbon particles are at least one selected from a group consisting of natural graphite, artificial graphite, carbon black, acetylene black, ketchen black, channel black, furnace black, lamp black, summer black and carbon fiber.

3. The cathode according to claim 1, wherein the carbon particles have an average particle diameter of 0.01 to 1 μm.

4. The cathode according to claim 1, wherein the polymer resin has a melting point of 80 to 200° C.

5. The cathode according to claim 1, wherein the carbon particles and the polymer resin are combined with the surface of the lithium transition metal oxide by physical bonding.

6. The cathode according to claim 1, wherein a relative content of the carbon particles to the polymer resin ranges from 90:10 to 10:90 (wt. %).

7. The cathode according to claim 1, wherein the lithium transition metal oxide is $Li_2Ni_{1-x-y}Co_xMn_yO_2$ ($0 \leq x \leq 1$, $0 \leq y \leq 1$, $0 \leq x+y \leq 1$, $0.95 \leq z \leq 1.15$).

8. A lithium secondary battery including the cathode as set forth in claim 1.

9. The lithium secondary battery according to claim 8, wherein the lithium secondary battery is used as a power supply for a power tool, an electric vehicle, an electric two-wheel vehicle and/or an electric golf cart.

* * * * *